United States Patent [19]
Justice

[11] 3,837,003
[45] Sept. 17, 1974

[54] VIDEO TAPE RECORDING OF LINE-SHARED TV SIGNALS

[75] Inventor: James W. H. Justice, Murrysville, Pa.

[73] Assignee: Westinghouse Electric Corporation, Pittsburgh, Pa.

[22] Filed: May 25, 1973

[21] Appl. No.: 364,159

[52] U.S. Cl................. 358/4, 178/DIG. 23, 360/18
[51] Int. Cl........................... H04n 5/78, H04n 7/08
[58] Field of Search.... 178/5.4 CD, 6.6 R, DIG. 23, 178/DIG. 3, 6.6 A; 179/100.2 MD

[56] References Cited

UNITED STATES PATENTS 3,571,503 3/1971 McMann, Jr. ........................ 178/6.7
3,686,436 8/1972 Camras........................... 178/6.6 SF

*Primary Examiner*—Robert L. Richardson
*Assistant Examiner*—Mitchell Saffian
*Attorney, Agent, or Firm*—M. P. Lynch

[57] ABSTRACT

A method and apparatus for producing a tape recording of line-shared video signals corresponding to *n*-separate pictures is accomplished by recording every *n*th line of each picture commencing from a different preselected line. A first tape recorder is used to record a video signal corresponding to one of the *n*-separate pictures by selecting every *n*th line thereof commencing with a preselected line. This recorded video signal includes a recording of horizontal sync pulses and vertical sync pulses. A replayed signal of this recorded video signal is combined by an add circuit with a video signal of another of the *n*-separate pictures consisting of every *n*th line thereof commencing with a preselected line. The second video signal is produced without sync pulses such that one line thereof is followed by a replayed line of recorded video signal. The combined video signals from the add circuit are in the form of line-shared signals which are then recorded onto a single piece of tape.

10 Claims, 6 Drawing Figures

PATENTED SEP 17 1974 3,837,003

SHEET 1 OF 2

VIDEO TAPE RECORDING OF LINE-SHARED TV SIGNALS

BACKGROUND OF THE INVENTION

This invention relates to a method and apparatus for recording the video signals corresponding to multiple pictures onto a single piece of a magnetic tape using a line-sharing technique and, if desired, recording such signals at different times.

TV systems in the past have been provided for transmitting a multiplicity of pictures simultaneously over a single TV channel by using line-sharing techniques. At the transmitter, a plurality of *n*-separate video pictures are transmitted in the form of video signals corresponding to every *n*th line of the pictures starting at a different line in each of the pictures. In the receiver, reception of the video pictures transmitted by such a line-sharing technique is accomplished by selecting from the plurality of lines transmitted, every *n*th line commencing at a preselected line so that there is obtained the selected one of the plurality of pictures originally transmitted.

The use of television for educational purposes has brought about a need to provide a multiplicity of video programs for branching purposes in order to enhance the learning process by the students. Conventional broadcast techniques require a number of channels for the multiplicity of programmed material. This is objectionable because there is a limited number of radio-frequency channels available, and furthermore, the endless switching from channel-to-channel will produce excess wear and premature failure of the conventional tuner assemblies.

In application Ser. No. 155,078, issued Apr. 3, 1973, now U.S. Pat. No. 3,725,571, filed June 21, 1971, and assigned to the Assignee of the present application, a line-sharing video receiver is disclosed for a multiplex video transmission system. The system features a receiver for a plurality of *n*-separate pictures wherein every *n*th line of each picture is selected for transmission beginning at a different line and wherein reception of the selected one of the pictures is accomplished by selecting from the plurality of lines transmitted every *n*th line commencing at the preselected line, with the selected line being delayed by a medium having a bandwidth less than the bandwidth of the video pictures and recombined with the undelayed selected line, so that the selected one of the pictures is in the form of a modulated subcarrier which is then demodulated and displayed on the picture tube. This is but one example of a multiplex line-sharing technique for the transmission of television video signals.

The economical use of television systems for many different applications including the field of education make it essential that a TV system be adapted to the use of video tape recordings of TV signals. However, considerable difficulties arise in the recording of the line-sharing of video signals, particularly when they are not recorded simultaneously. The organization necessary for simultaneous recording of two or more programs for branching purposes, would become extremely complex requiring an exact, timed studio production of the material to be recorded, and in some cases this would be impossible. Therefore, it is highly desirable that a recording system be provided to record programs occurring at different times.

SUMMARY OF THE INVENTION

The present invention relates to producing a recrodding of video signals corresponding to multiple pictures which are recorded at different times and using line-sharing techniques to produce a recording of the video signals on a single piece of magnetic tape.

Broadly, the present invention provides a method and apparatus of producing a recording of video signals corresponding to *n*-separate pictures which includes the steps of: recording a video signal corresponding to one of said *n*-separate pictures by selecting every *n*th line thereof commencing with a preselected line, the recorded video signal including a recording of sync pulses produced during every line of the selected video signal; replaying the recorded video signal; producing a video signal of another of the *n*-separate pictures by selecting every *n*th line commencing with the preselected line, the video signal being produced occurring synchronously with the replaying of the recorded video signal such that the *n*th line of one picture is followed by the *n*th line of a different picture; and recording onto a single tape the replayed video signal and the produced video signal.

BRIEF DESCRIPTION OF THE DRAWINGS

These features and advantages of the present invention as well as others will be more fully understood when the following description is read in light of the accompanying drawings, in which.

DESCRIPTION OF THE PREFERRED EMBODIMENT

Figure 1:
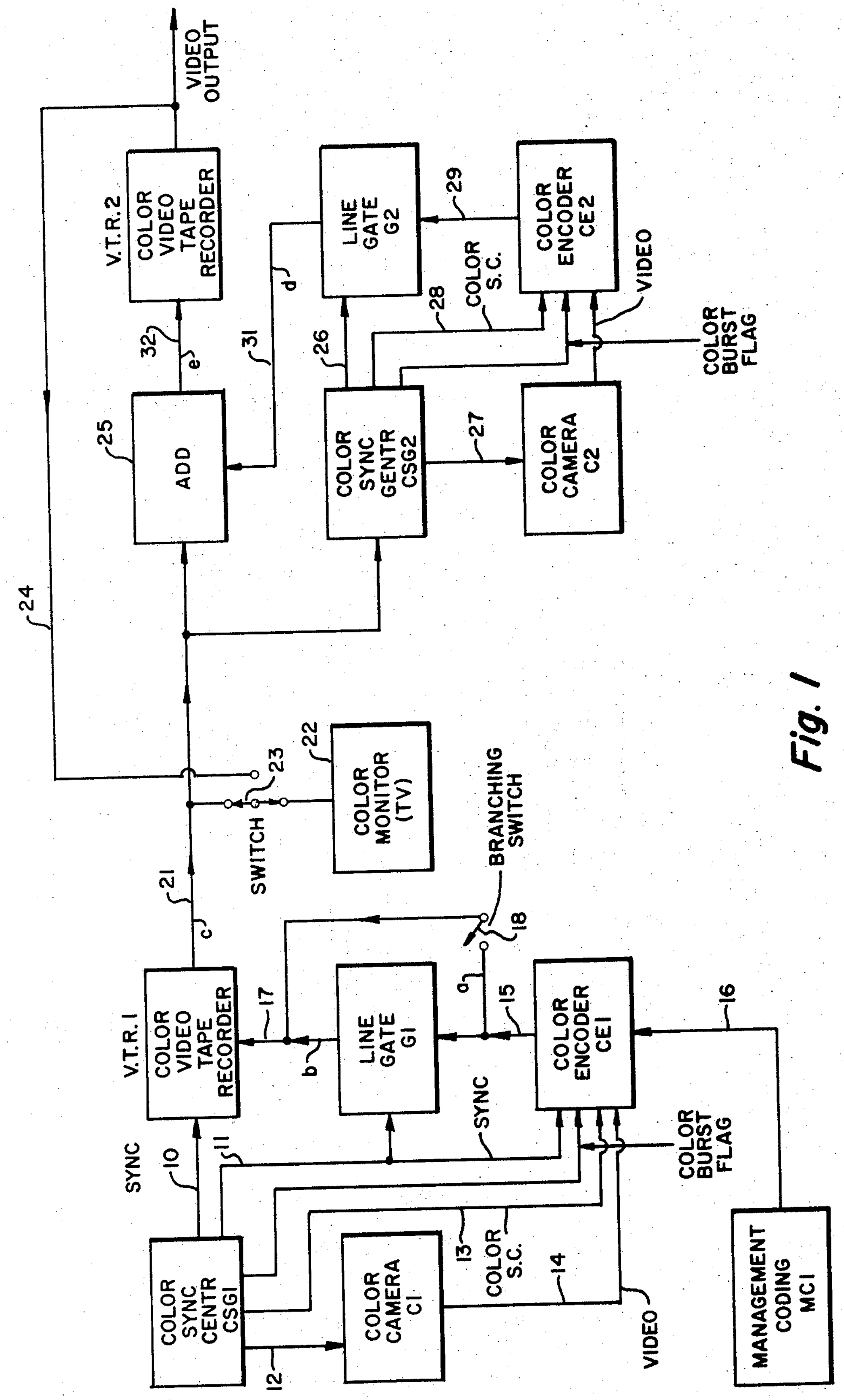
FIG. 1 is a block diagram of a recording system for video signals according to the present invention.

In FIG. 1, a video recording system is disclosed including the use of two color cameras along with associated devices to be described hereinafter, on the basis of which it will be apparent to those skilled in the art that more than two color cameras or other sources of video signals may be used whereby *n*-separate video signals can be recorded to form a single recording.

As illustrated in FIG. 1, there is provided a color sync generator CSG1 for producing horizontal and vertical sync pulses delivered by lines 10, 11 and 12 to a video tape record VTR1, line gate G1, color encoder CE1, and a color camera C1. The color sync generator CSG1 also produces a 3.58 megahertz subcarrier signal in line 13 connected to the color encoder CE1 and a color burst flag. The camera C1 provides a video signal in line 14 to the encoder CE1 to produce encoded video signals in line 15 which may include management coding signals in line 16 from a coder MC1.

Figure 2:
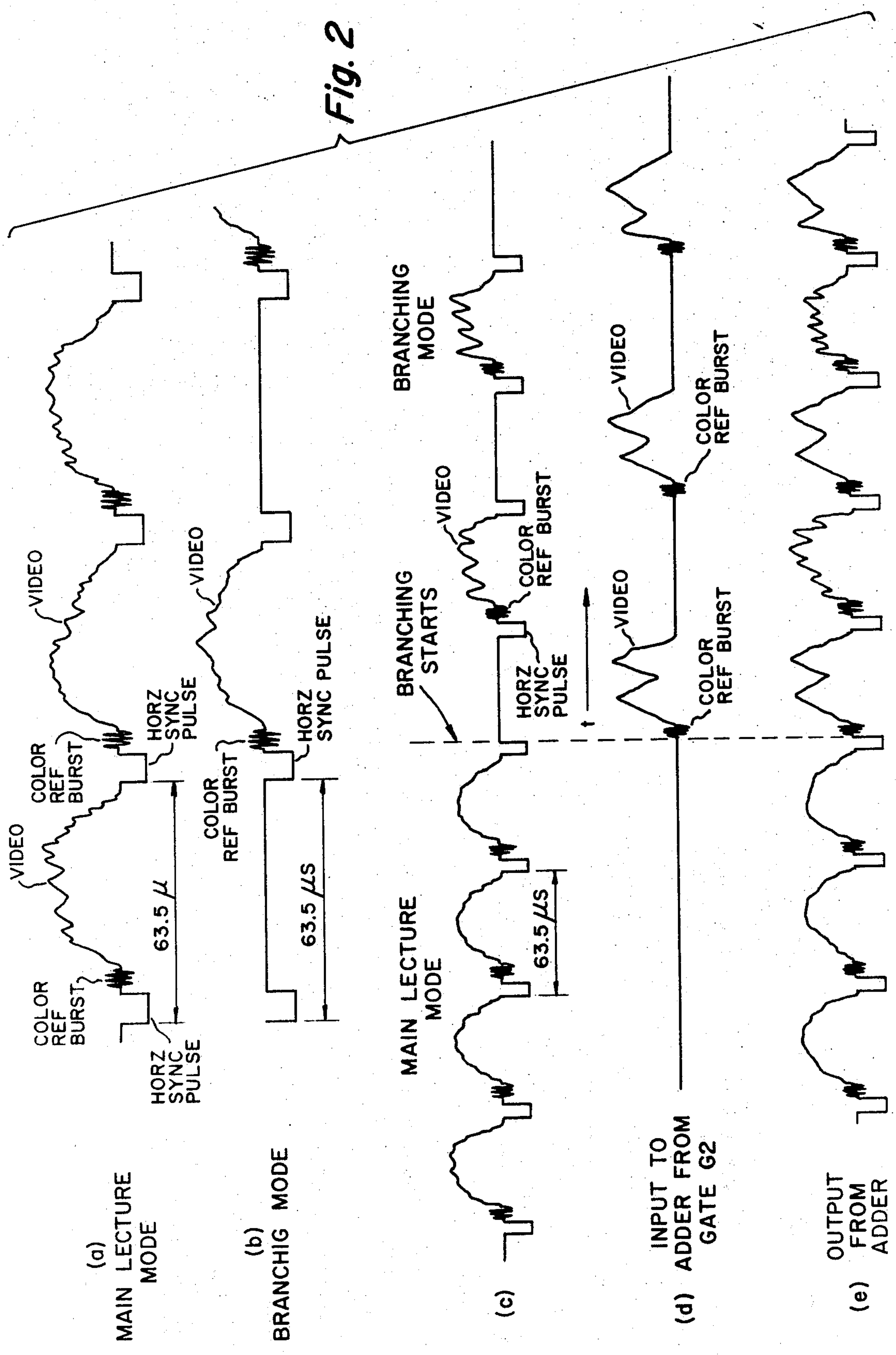
FIGS. 2A–2E are waveform diagrams illustrating the operation of the recording system shown in FIG. 1.

An encoded video signal in line 15 can pass through a line 17 when a switch 18 provided therein is in its conducting position whereby the encoded video signal is continuously applied to tape recorder VTR1. The main lecture mode, which is nonbranching, is shown by the waveform of FIG. 2A. In this mode of operation, the signal to the tape recorder is illustrated by FIG. 2A wherein each horizontal scan line contains the usual horizontal sync pulse followed by a color reference burst which is, in turn, followed by a video signal. As indicated in FIG. 2A, each horizontal scan line has a time duration of approximately 63.5 microseconds according to conventional TV transmission practice.

When it is desired to produce a recording of a plurality of pictures for branching purposes using line-sharing techniques, the branching switch 18 is arranged in a non-condcuting position whereby the encoded color video signal in line 15 is delivered to line gate G1, where the video signal in line 17 has alternate lines blanked as illustrated by the wave form of FIG. 2B. This blanking is done in such a manner that the horizontal sync pulses remain in their conventional timed position being separated by a time interval of 63.5 microseconds. However, the blanking of lines removes the color reference burst and the video signal during that line time period. After blanking, the gate is rendered conductive to produce a color reference burst and video signal of the next succeeding line. The video signal with the waveform illustrated by FIG. 2C is recorded by tape recorder VTR1. The system thus far described makes possible the production of a recording containing a main lecture wherein every horizontal scan line is used to record the video signal. This main lecture may then be followed by a branching mode occurring when the switch 18 is rendered non-conductive, and alternate horizontal scan lines or generally stated every nth horizontal scan line is blanked to remove only the color bursts and video signals.

At some preselected time later after the recording of the video signals using tape recorder VTR1, the recorder is operated in its playback mode to provide a video signal in line 21 having, for example, the waveform illustrated in FIG. 2C. This video signal may be monitored by a color TV monitor 22 by closing the switch 23. The TV monitor may also be employed to display the combined recording of video signals from the output of a second color video tape recorder VTR2. In this event, the output signal from the tape recorder to be described in greater detail hereinafter is branched along line 24 to a contact in the switch 23 which is made in this instance as a two-position switch.

The video signal in line 21 is branched with one line being connected to add circuit 25, and the second branched line being connected to a color sync generator CSG2 which is used in a locked mode to produce sync pulses in phase with the horizontal and vertical sync pulses in line 21 from the tape recorder VTR1. The color sync generator CSG2 is phase-locked to the sync pulses in line 21 to produce horizontal and vertical sync pulses in lines 26 and 27 and a 3.58 megahertz color subcarrier reference signal in line 28. Line 27 is connected to a color camera C2 for forming one of *n*cameras to produce *n*-video signals corresponding to *n*different pictures. The video signal from camera C2 is delivered to a color encoder CE2 which also receives the color subcarrier in line 28 and a color burst flag to produce an encoded color signal in line 29 connected to a line gate G2. This gate is rendered conductive in response to the pulses in line 26 to provide a signal in line 31 to the add circuit 25 consisting of only color reference bursts and video signals that occur in such a time relation with the signal in line 21 that they can be combined to form a composite video signal using the add circuit 25. The signal in line 31 has the general waveform illustrated by FIG. 2D wherein it will be observed that the signal consists only of a color reference burst followed by a video signal which is then followed by a blank period before the next color reference burst and video signal. The add circuit 25 produces a video output signal in line 32 represented by the waveform illustrated by FIG. 2E. After the main lecture mode, the video signal is a composite video signal made up of alternate lines from the color camera C1 and between these lines a color reference burst and video signal is inserted from the color camera C2. The composite signal in line 32 is then connected to the input of the color video tape recorder VTR2 for recording the video signal on a single tape. This tape may then be used as a source of multiplex or line-shared video signals for educational TV systems without requiring the simultaneous studio production of the video programmed material. It is important to note that the color sync generator CSG2 is used in a color generator locked mode whereby the color subcarrier in line 28 is locked in frequency and phase by the color burst of the video signal from the color video tape recorder VTR1. Also, the horizontal and vertical sync pulses are locked by the incoming video sync signals from the tape recorder VTR1. The video signals from encoder CE2 have the normal horizontal and vertical blanking but do not contain horizontal and vertical synchronizing pulse information. When the *n*-video pictures consist of two video signals as described above with respect to FIG. 1, the signals have alternate lines of video signals removed, and the signals are combined so that one line of video signal from camera C1 is followed by a line of video signals from camera C2. Static phase errors which may occur in the second recording of the video signals by tape recorder VTR2 can be removed by the subcarrier phase adjustment for encoder CE2 which is usually provided for standard encoders. Such phase errors can be observed by comparison of the color bursts associated with each of the branch lines at the output of the adder.

In view of the foregoing description, the gates G1 and G2, the cameras C1 and C2 and the encoders CE1 and CE2 can be used in the manner described or only one gate, one camera and one encoder may be used to produce a video tape using recorder VTR1, and then the same circuitry can be used for producing a video tape using recorder VTR2. Thus, the *n*-separate video signals may be processed using *n*-number of separate cameras or, instead, one color camera along with a color encoder and gate can be used to provide *n*-separate video signals.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. A method of producing a recording of video signals corresponding to *n*-separate pictures, said method comprising the steps of:

recording a video signal corresponding to one of said *n*-separate pictures by selecting every *n*th line thereof commencing with a preselected line, said recording of a video signal including a recording of a sync pulse produced during every line in the selected video signal, replaying said recording of the video signal corresponding to one of said *n*-seprate pictures, producing a video signal of another of said $n$-separate pictures by selecting every $n$th line thereof commencing with a preselected line, said producing a video signal occurring synchronously with said replaying of said recording such that the $n$th line of one picture is followed by the nth line of a different picture, and recording on a single tape the replayed video signal and the produced video signal.

2. The method according to claim 1 comprising the further step of:

combining the replayed video signal and the produced video signal to form a composite video signal for said recording on a single tape recording channel.

3. The method according to claim 2 wherein the video signals of said $n$-separate pictures are encoded color video signals.

4. The method according to claim 3 comprising the additional step of producing sync pulses locked in phase to recorded sync pulses forming part of said recording of a video signal for controling said producing a video signal.

5. The method according to claim 4 wherein said recording of a video signal further includes a recording of composite sync pulses of said one of said $n$-separate pictures.

6. The method according to claim 4 wherein said recording of a video signal further includes a recording of a color subcarrier reference burst, said method comprising the additional step of producing color subcarrier reference bursts in phase with said recording of a color subcarrier reference burst for said producing a video signal.

7. In a system for producing a single recording of video signals corresponding to $n$-separate pictures by recording every nth line of each picture commencing from a different preselected line of each picture, the combination comprising:

means for producing a plurality of video signals corresponding to said $n$-separate pictures, means for selecting from the video signals of said $n$-separate pictures every $n$th line of each picture commencing from a different preselected line of each picture, means for recording sync pulses and every $n$th line of the video signal corresponding to one of said $n$-separate pictures, means for summing the recorded video signal by said means for recording and the video signal corresponding to every $n$th line of each remaining picture commencing from a different preselected line of such remaining pictures, and means for recording the summed video signals produced by said means for summing.

8. The combination of claim 7 wherein said means for producing a plurality of video signals includes at least one color camera to produce color video signals corresponding to $n$-separate color pictures, said combination further comprising:

means for encoding said color video signals corresponding to $n$-separate color pictures.

9. The combination according to claim 8 further comprising:

means generating color sync pulses for controlling said means for selecting, said means for recording sync pulses, said means for encoding and said means for producing a video signal corresponding to one of the $n$-separate pictures.

10. The combination according to claim 9 further comprising:

sync pulse generator means locked to said means for generating to control said means for selecting, said means for encoding and said means for producing such video signals corresponding to pictures exclusive of said one of the $n$-separate pictures.

* * * * *